United States Patent
Yuen et al.

(10) Patent No.: US 10,178,337 B1
(45) Date of Patent: Jan. 8, 2019

(54) ONCOMING LEFT TURN VEHICLE VIDEO TRANSMIT

(71) Applicant: GM GLOBAL TECHNOLOGY OPERATIONS LLC, Detroit, MI (US)

(72) Inventors: Ephraim C. Yuen, Markham (CA); Shiv G. Patel, Toronto (CA); Akram Abdel-Rahman, Ajax (CA)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 71 days.

(21) Appl. No.: 15/641,906

(22) Filed: Jul. 5, 2017

(51) Int. Cl.
| | |
|---|---|
| *H04N 5/38* | (2006.01) |
| *B60R 1/00* | (2006.01) |
| *G08G 1/04* | (2006.01) |
| *H04N 5/44* | (2011.01) |
| *G06K 9/00* | (2006.01) |

(52) U.S. Cl.
CPC .............. *H04N 5/38* (2013.01); *B60R 1/00* (2013.01); *G06K 9/00798* (2013.01); *G08G 1/04* (2013.01); *H04N 5/44* (2013.01); *B60R 2300/105* (2013.01); *B60R 2300/406* (2013.01)

(58) Field of Classification Search
CPC ... H04N 5/38; H04N 5/44; B60R 1/00; B60R 2300/105; B60R 2300/406; G06K 9/00798; G08G 1/04
See application file for complete search history.

(56) References Cited

U.S. PATENT DOCUMENTS

2017/0287338 A1\* 10/2017 Neubecker ................ B60R 1/00

\* cited by examiner

*Primary Examiner* — Yuen H Wong
(74) *Attorney, Agent, or Firm* — Lorenz & Kopf, LLP

(57) ABSTRACT

Methods and systems are provided for providing vehicles with video feed for making a turn. In one example, a vehicle includes sensors, a transceiver, a processor, and a display device. The sensors are configured to generate sensor data pertaining to operation of the vehicle. The processor is configured to determine when the vehicle is about to make a turn at an intersection, based at least in part on the sensor data. The transceiver is configured to receive a video feed from one or more cameras of a second vehicle, the second vehicle disposed proximate the intersection, when the vehicle is about to make a turn, for use in assistance with making the turn of the vehicle at the intersection. The display device is configured to display the video feed in accordance with instructions provided by the processor.

14 Claims, 3 Drawing Sheets

ONCOMING LEFT TURN VEHICLE VIDEO TRANSMIT

TECHNICAL FIELD

The technical field generally relates to the vehicles and, more specifically, to methods and systems for assisting vehicles making left turns.

BACKGROUND

Many vehicles include various systems for improved operation of the vehicle. However, in certain situations, in may be difficult for a driver of a vehicle to see oncoming traffic when the vehicle is about to make a left turn, for example if another vehicle is blocking part of the vision for the driver of the vehicle.

Accordingly, it is desirable to provide improved methods and systems for control for vehicles making left turns. Furthermore, other desirable features and characteristics of the present invention will become apparent from the subsequent detailed description of the invention and the appended claims, taken in conjunction with the accompanying drawings and this background of the invention.

SUMMARY

In accordance with an exemplary embodiment, a method is provided. The method includes determining, via a processor, when a first vehicle is about to make a turn at an intersection; and receiving, via a transceiver, a video feed from one or more cameras of a second vehicle, the second vehicle disposed proximate the intersection, when the first vehicle is about to make a turn, for use in assistance with making the turn of the first vehicle at the intersection.

In addition, in one example, the method further includes wherein the receiving step occurs when the second vehicle is disposed in front of the second vehicle as the first vehicle is waiting to make the turn.

In addition, in one example, the method further includes wherein the receiving step occurs when (i) the first vehicle is disposed within a first turn lane of the intersection; and (ii) the second vehicle is disposed within a second turn lane of the intersection, opposite the first turn lane.

In addition, in one example, the method further includes wherein the video feed includes camera images from behind the second vehicle.

In addition, in one example, the method further includes wherein the camera images from behind the second vehicle are in an obstructed field of view from a perspective of a driver of the first vehicle, in which the field of view is obstructed at least in part by the second vehicle.

In addition, in one example, the method further includes providing a display with the video feed on a display device of the first vehicle.

In addition, in one example, the method further includes taking an automatic action, via a processor, based on the video feed.

In addition, in one example, the method further includes: receiving, via the transceiver, a warning from the second vehicle with respect to a detected object that may interfere with the first vehicle's ability to make the turn; and providing the warning for a driver of the first vehicle.

In addition, in one example, the method further includes: obtaining further video images from behind the vehicle, via a camera; and transmitting the further video images, via the transceiver, in accordance with instructions provided by the processor, to the second vehicle, to assist the second vehicle in making a respective turn of the second vehicle.

In addition, in one example, the method further includes wherein: the determining step comprises determining, via a processor, when a first vehicle is about to make a left turn at an intersection, based at least in part on whether the vehicle is in a first left turn lane of the intersection; and the receiving step comprises receiving, via the transceiver, the video feed from the one or more cameras of the second vehicle, including images from behind the second vehicle, when the first vehicle is disposed within the first left turn lane of the intersection and the second vehicle is disposed within a second left turn lane of the intersection, opposite the first left turn lane.

In accordance with another exemplary embodiment, a system includes a processor and a transceiver. The processor is configured to determine when a first vehicle is about to make a turn at an intersection. The transceiver is configured to receive a video feed from one or more cameras of a second vehicle, the second vehicle disposed proximate the intersection, when the first vehicle is about to make the turn, for use in assistance with making the turn of the first vehicle at the intersection.

In addition, in one example, the transceiver is configured to receive the video feed when: (i) the first vehicle is disposed within a first turn lane of the intersection; and (ii) the second vehicle is disposed within a second turn lane of the intersection, opposite the first turn lane.

In addition, in one example, the video feed includes camera images from behind the second vehicle.

In addition, in one example, the system further includes a display device configured to display the video feed, in accordance with instructions provided by the processor.

In addition, in one example, the transceiver is further configured to receive a warning from the second vehicle with respect to a detected object that may interfere with the first vehicle's ability to make the turn; and the display device is further configured to provide the warning for a driver of the first vehicle, in accordance with instructions provided by the processor.

In addition, in one example, the processor is configured to determine when the first vehicle is about to make a left turn at the intersection; and the transceiver is configured to receive the video feed from the one or more cameras of the second vehicle when the first vehicle is about to make the left turn, for use in assistance with making the turn of the first vehicle at the intersection.

In another exemplary embodiment, a vehicle includes one or more sensors, a transceiver, a processor, and a display device. The one or more sensors are configured to generate sensor data pertaining to operation of the vehicle. The processor is configured to determine when the vehicle is about to make a turn at an intersection, based at least in part on the sensor data. The transceiver is configured to receive a video feed from one or more cameras of a second vehicle, the second vehicle disposed proximate the intersection, when the vehicle is about to make the turn, for use in assistance with making the turn of the vehicle at the intersection. The display device is configured to display the video feed in accordance with instructions provided by the processor.

In addition, in one example, the video feed includes camera images from behind the second vehicle.

In addition, in one example, the transceiver is configured to receive the video feed when: (i) the first vehicle is disposed within a first left turn lane of the intersection and is about to make a left turn at the intersection; and (ii) the second vehicle is disposed within a second left turn lane of the intersection, opposite the first turn lane In addition, in one example, the vehicle further includes a camera that is configured to obtain further video images from behind the vehicle, and the transmitter is further configured to transmit the further video images, in accordance with instructions provided by the processor, to the second vehicle, to assist the second vehicle in making a respective left turn of the second vehicle.

DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the disclosure or the application and uses thereof. Furthermore, there is no intention to be bound by any theory presented in the preceding background or the following detailed description.

Figure 1:
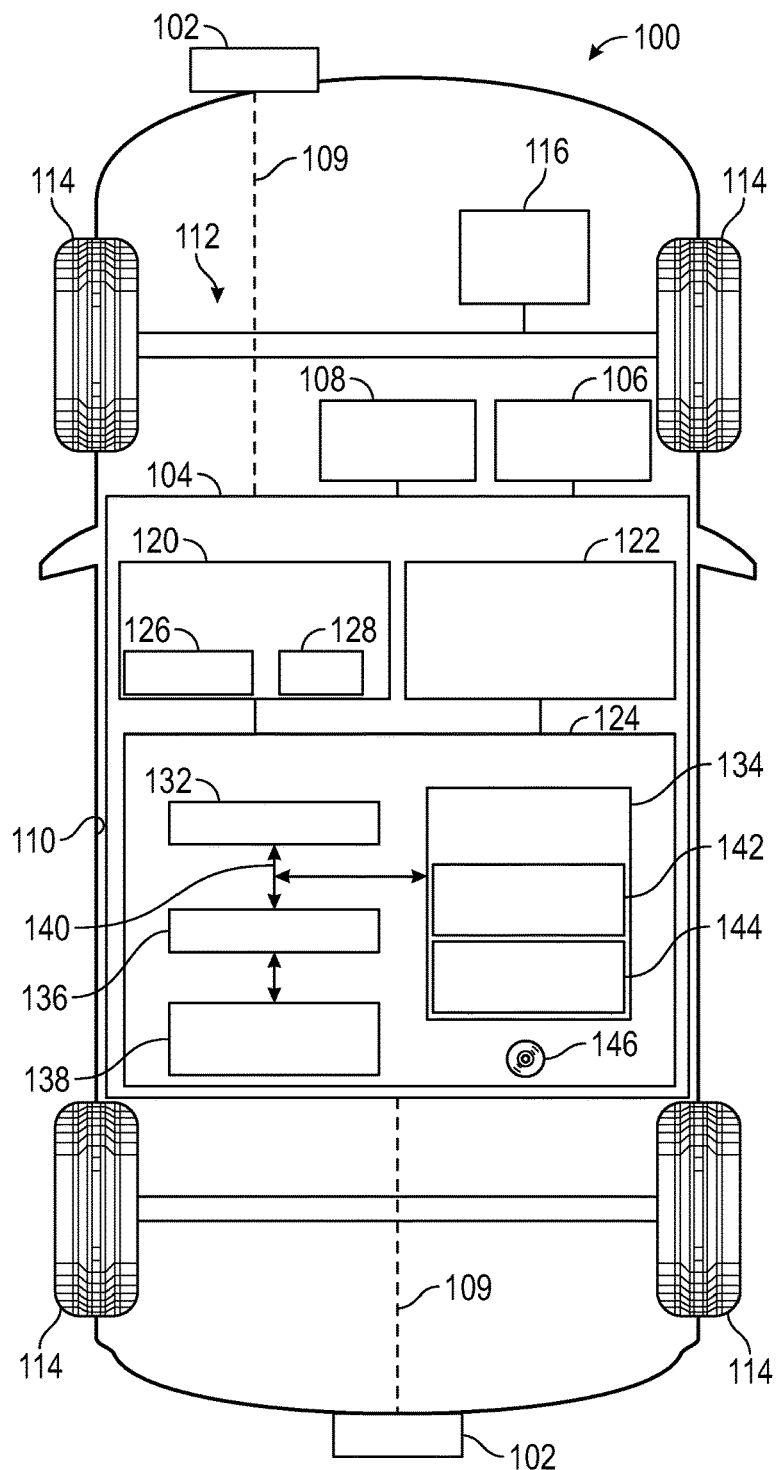
FIG. 1 is a functional block diagram of a vehicle that includes a camera and a control system for assisting the vehicle when making a turn (e.g., a left turn), and that also includes a navigation system and one or more displays for displaying a video feed and/or other content from another vehicle when the vehicle is making a turn, in accordance with an exemplary embodiment.

FIG. 1 illustrates a vehicle 100, according to an exemplary embodiment. As described in greater detail further below, the vehicle 100 includes a plurality of cameras 102, a control system 104, a navigation system 106, and a display 108 (also referred to herein as a display device).

As depicted in FIG. 1, the cameras 102 include both a rear vision camera that is mounted on a rear portion of the vehicle 100, and a front vision camera that is mounted on a front portion of the vehicle 100. The cameras 102 provide images from behind and in front of the vehicle 100, for example to assist the vehicle 100 and/or other nearby vehicles that are about to make a left hand turn. The cameras 102 are controlled via a control system 104, as depicted in FIG. 1. The control system 104 is also coupled to the navigation system 106 and the display 108. In various embodiments, the control system 104 provides various actions when the vehicle 100 is about to make a turn (e.g., left turn, in parts of the world in which vehicles are driven on the right side of the road, or a right turn, in parts of the world in which vehicles are driven on the left side of the road, in certain embodiments), including obtaining video feed and other information from another vehicle for display on the display 108 when the vehicle 100 is about to make the turn. In addition, in various embodiments, the control system 104 also assists in providing video feed and other information to other vehicles in certain situations in which the other vehicles are about to make a turn. In various embodiments, the control system 104 provides these and other functions in accordance with the implementation and process discussed further below in connection with FIGS. 2 and 3.

The vehicle 100 preferably comprises an automobile. The vehicle 100 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD) or all-wheel drive (AWD), and/or various other types of vehicles in certain embodiments. In certain embodiments, the vehicle 100 may also comprise a motorcycle or other vehicle, or other system having a camera image with a fixed referenced point.

The vehicle 100 includes the above-referenced body 110 that is arranged on a chassis 112. The body 110 substantially encloses other components of the vehicle 100. The body 110 and the chassis 112 may jointly form a frame. The vehicle 100 also includes a plurality of wheels 114. The wheels 114 are each rotationally coupled to the chassis 112 near a respective corner of the body 110 to facilitate movement of the vehicle 100. In one embodiment, the vehicle 100 includes four wheels 114, although this may vary in other embodiments (for example for trucks and certain other vehicles).

A drive system 116 is mounted on the chassis 112, and drives the wheels 114. The drive system 116 preferably comprises a propulsion system. In certain exemplary embodiments, the drive system 116 comprises an internal combustion engine and/or an electric motor/generator, coupled with a transmission thereof. In certain embodiments, the drive system 116 may vary, and/or two or more drive systems 116 may be used. By way of example, the vehicle 100 may also incorporate any one of, or combination of, a number of different types of propulsion systems, such as, for example, a gasoline or diesel fueled combustion engine, a "flex fuel vehicle" (FFV) engine (i.e., using a mixture of gasoline and alcohol), a gaseous compound (e.g., hydrogen and/or natural gas) fueled engine, a combustion/electric motor hybrid engine, and an electric motor.

As depicted in FIG. 1, the cameras 102 are mounted on the body 110 of the vehicle 100. In the depicted embodiment, different cameras 102 are mounted on a rear end of the vehicle 100 and a front end of the vehicle 100, as shown in FIG. 1. Also in the depicted embodiment, the cameras 102 capture images from behind the vehicle 100 and in front of the vehicle 100. In certain embodiments, cameras may also be disposed on one or more other locations of the vehicle 100, for example on top of the vehicle 100 and/or on the vehicle 100 sides, for example to create a surround view and/or one or more other views for the vehicle 100.

The cameras 102 provide images for viewing on one or more displays 108 that are disposed inside the vehicle 100 (i.e. inside the body 110 of the vehicle 100), for example when the vehicle 100 is about to make a turn. In addition, in certain embodiments, the camera images are also transmitted to one or more other vehicles that may be about to make a turn. In addition, in certain embodiments, the camera images are also provided to a vehicle control system for use in vehicle control, and so on.

In various embodiments, the navigation system 106 provides location information for the vehicle 100. For example, in various embodiments, the navigation system 106 comprises a satellite-based system, such as a global positioning system (GPS) and/or other satellite-based system, and provides location information regarding a current position of the vehicle 100. In certain embodiments, the navigation system 106, and/or one or more components thereof, may be disposed within and/or be part of the control system 104. In other embodiments, the navigation system 106 may be coupled to the control system 104.

The display 108 displays video images, such as from the cameras 102 of the vehicle 100 as well as respective cameras from other vehicles, for example when the vehicle 100 is about to make a turn. In one embodiment, the display 108 is located on a center console of the vehicle 100. However, this may vary in other embodiments. In various other embodiments, the display 108 may be part of a radio display, a navigation display, and/or other display, for example as part of or in proximity to the center console. In certain other embodiments, the display 108 may be part of one or more other vehicle 100 components, such as a rear view mirror. In one exemplary embodiment the display 108 comprises a liquid crystal display (LCD) screen or a light emitting diode (LED) screen. However, this may vary in other embodiments.

The control system 104 controls operation of the cameras 102 and takes action when the vehicle 100 and/or other vehicles are making a turn, among other functions. In various embodiments, the control system 104 provides these and other functions in accordance with the steps of the process 300 discussed further below in connection with the implementation of FIG. 2 and the process 300 of FIG. 3, in accordance with an exemplary embodiment.

In various embodiments, the control system 104 is disposed within the body 110 of the vehicle 100. In one embodiment, the control system 104 is mounted on the chassis 112. In certain embodiments, the control system 104 and/or one or more components thereof may be disposed outside the body 110, for example on a remote serve, in the cloud, or in a remote smart phone or other device where image processing is performed remotely. In addition, in certain embodiments, the control system 104 may be disposed within and/or as part of the cameras 102, navigation system 106, and/or display 108, and/or within and/or or as part of one or more other vehicle systems.

Also as depicted in FIG. 1, in various embodiments the control system 104 is coupled to the cameras 102 via one or more communications links 109, and receives camera images from the cameras 102 via the communications link 109. In certain embodiments, the communications link 109 comprises one or more wired connections, such as one or more cables (e.g. coaxial cables and/or one or more other types of cables). In other embodiments, the communications link 109 may comprise one or more wireless connections, e.g., using transceiver 122 depicted in FIG. 1.

As depicted in FIG. 1, the control system 104 includes a sensor array 120 and a transceiver 122. Also as depicted in FIG. 1, in certain embodiments the control system 104 may also include and/or is part of one or more of the cameras 102, the navigation system 106, and/or the display 108, and/or one or more components thereof.

The sensor array 120 generates sensor data, and provides the sensor data to the controller 124 for processing. As depicted in FIG. 1, the sensor array 120 includes one or more detection sensors 126. In various embodiments, the detection sensors 126 include one or more sensors (e.g., radar, lidar, sonar, ultrasonic and so on) that detect objects (e.g., moving vehicles) in proximity to the vehicle. Also in various embodiments, the sensor array 120 may further comprise one or more other sensors 128 (e.g., wheel speed sensors, accelerometers, wheel position sensors, steering angle sensors, turn direction sensors, gear sensors, and so on) that provide data pertaining to vehicle operation that may be pertain to turns made by the vehicle 100 and/or other vehicles. It will also be appreciated that in various embodiments the sensor array 120 may also include the cameras 102, sensors form the navigation system 106, and/or various other types of sensors.

The transceiver 122 transmits messages to, and receives messages from, other vehicles. Specifically, in various embodiments, the transceiver 122 transmits (via instructions provided by the controller 124) video feed and other information, under appropriate circumstances, to other vehicles that are about to make a turn. Also in various embodiments, the transceiver 122 also receives video feed and other information, under appropriate circumstances, from other vehicles when the vehicle 100 is about to make a turn. It will be appreciated that in certain embodiments the transceiver 122 may comprise separate transmitters and/or receivers, or the like.

The controller 124 controls operation of the control system 104, and facilitates sharing of video feeds and other information between vehicles when one or more of the vehicles is about to make a turn. In various embodiments, the controller 124 provides these and other functions in accordance with the steps of the process 300 discussed further below in connection with the implementation of FIG. 2 and the process 300 of FIG. 3.

In one embodiment, the controller 124 is coupled to the cameras 102, the navigation system 106, the sensor array 120, the transceiver 122, and the display 108. Also in one embodiment, the controller 124 is disposed within the control system 104, within the vehicle 100. In certain embodiments, the controller 124 (and/or components thereof, such as the processor 132 and/or other components) may be part of and/or disposed within the cameras 102, the navigation system 106, the display 108, and/or one or more other vehicle components. Also in certain embodiments, the controller 124 may be disposed in one or more other locations of the vehicle 100. In addition, in certain embodiments, multiple controllers 124 may be utilized (e.g. one controller 124 within the vehicle 100 and another controller within the cameras 102, the navigation system 106, and/or the display 108), among other possible variations. In addition, in certain embodiments, the controller can be placed outside vehicle, such as in a remote server, in the cloud or on a remote smart device.

As depicted in FIG. 1, the controller 124 comprises a computer system. In certain embodiments, the controller 124 may also include the cameras 102, the navigation system 106, the display 108, the sensor array 120, the transceiver 122, and/or one or more components thereof. In addition, it will be appreciated that the controller 124 may otherwise differ from the embodiment depicted in FIG. 1. For example, the controller 124 may be coupled to or may otherwise utilize one or more remote computer systems and/or other control systems, for example as part of one or more of the above-identified vehicle 100 devices and systems.

In the depicted embodiment, the computer system of the controller 124 includes a processor 132, a memory 134, an interface 136, a storage device 138, and a bus 140. The processor 132 performs the computation and control functions of the controller 124, and may comprise any type of processor or multiple processors, single integrated circuits such as a microprocessor, or any suitable number of integrated circuit devices and/or circuit boards working in cooperation to accomplish the functions of a processing unit. During operation, the processor 132 executes one or more programs 142 contained within the memory 134 and, as such, controls the general operation of the controller 124 and the computer system of the controller 124, generally in executing the processes described herein, such as the process 300 described further below in connection with FIG. 3 and the implementation discussed below in connection with FIG. 2.

The memory 134 can be any type of suitable memory. For example, the memory 134 may include various types of dynamic random access memory (DRAM) such as SDRAM, the various types of static RAM (SRAM), and the various types of non-volatile memory (PROM, EPROM, and flash). In certain examples, the memory 134 is located on and/or co-located on the same computer chip as the processor 132. In the depicted embodiment, the memory 134 stores the above-referenced program 142 along with one or more stored values 144.

The bus 140 serves to transmit programs, data, status and other information or signals between the various components of the computer system of the controller 124. The interface 136 allows communication to the computer system of the controller 124, for example from a system driver and/or another computer system, and can be implemented using any suitable method and apparatus. In one embodiment, the interface 136 obtains the various data from the cameras 102, the navigation system 106, the transceiver 122, and/or the sensor array 120. The interface 136 can include one or more network interfaces to communicate with other systems or components. The interface 136 may also include one or more network interfaces to communicate with technicians, and/or one or more storage interfaces to connect to storage apparatuses, such as the storage device 138.

The storage device 138 can be any suitable type of storage apparatus, including direct access storage devices such as hard disk drives, flash systems, floppy disk drives and optical disk drives. In one exemplary embodiment, the storage device 138 comprises a program product from which memory 134 can receive a program 142 that executes one or more embodiments of one or more processes of the present disclosure, such as the steps of the process 300 (and any sub-processes thereof) described further below in connection with FIG. 3. In another exemplary embodiment, the program product may be directly stored in and/or otherwise accessed by the memory 134 and/or a disk (e.g., disk 146), such as that referenced below.

The bus 140 can be any suitable physical or logical means of connecting computer systems and components. This includes, but is not limited to, direct hard-wired connections, fiber optics, infrared and wireless bus technologies. During operation, the program 142 is stored in the memory 134 and executed by the processor 132.

It will be appreciated that while this exemplary embodiment is described in the context of a fully functioning computer system, those skilled in the art will recognize that the mechanisms of the present disclosure are capable of being distributed as a program product with one or more types of non-transitory computer-readable signal bearing media used to store the program and the instructions thereof and carry out the distribution thereof, such as a non-transitory computer readable medium bearing the program and containing computer instructions stored therein for causing a computer processor (such as the processor 132) to perform and execute the program. Such a program product may take a variety of forms, and the present disclosure applies equally regardless of the particular type of computer-readable signal bearing media used to carry out the distribution. Examples of signal bearing media include: recordable media such as floppy disks, hard drives, memory cards and optical disks, and transmission media such as digital and analog communication links. It will be appreciated that cloud-based storage and/or other techniques may also be utilized in certain embodiments. It will similarly be appreciated that the computer system of the controller 124 may also otherwise differ from the embodiment depicted in FIG. 1, for example in that the computer system of the controller 124 may be coupled to or may otherwise utilize one or more remote computer systems and/or other control systems.

Figure 2:
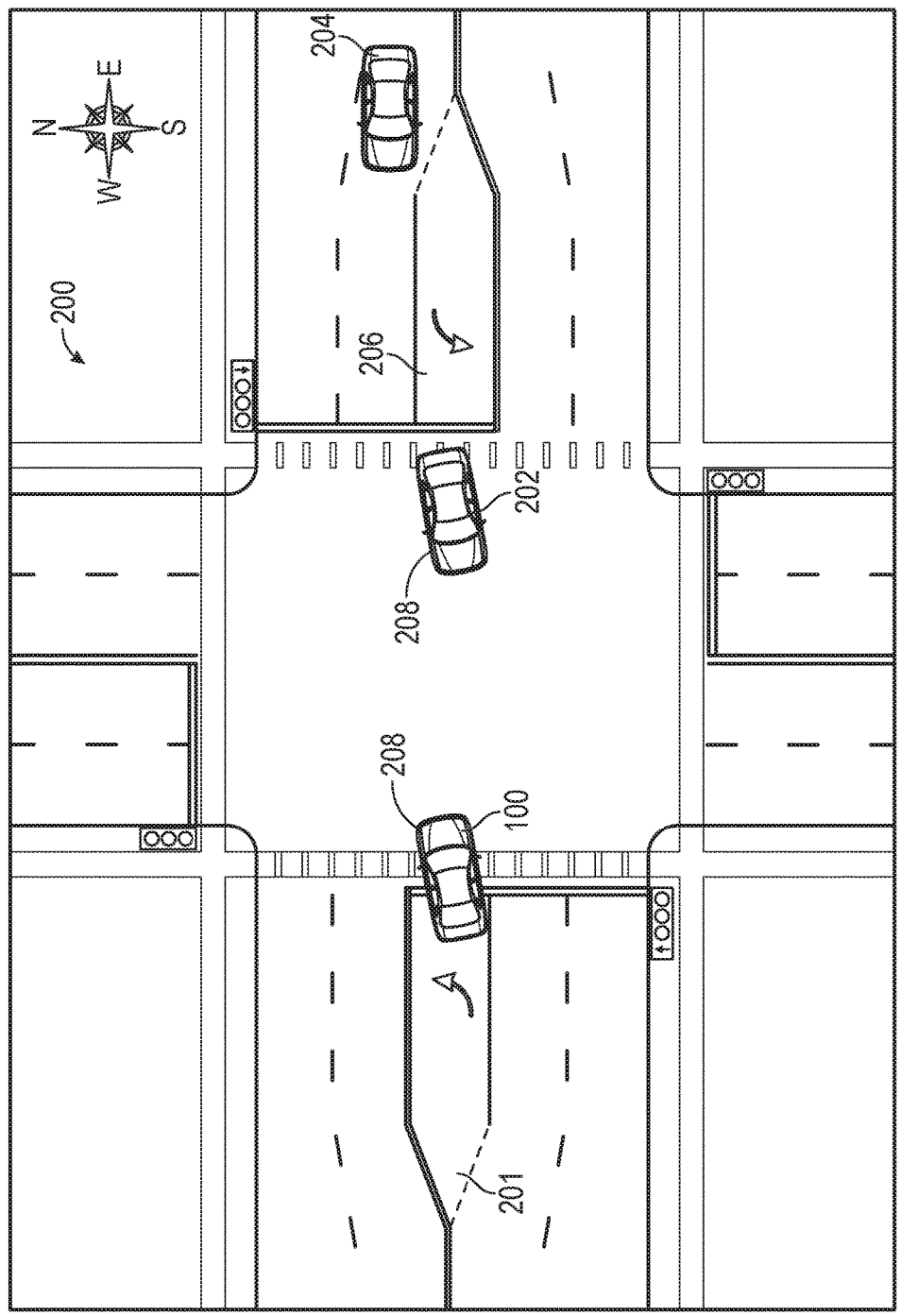
FIG. 2 is a schematic illustration showing an intersection of a roadway in which the vehicle is about to make a turn, in accordance with an exemplary embodiment.

FIG. 2 is a functional block diagram for an illustration in accordance with an implementation of the present disclosure showing an intersection 200 of a roadway, in accordance with an exemplary embodiment. Specifically, FIG. 2 shows one implementation in which the vehicle 100 is attempting to make a left turn from a first left turn lane 201, and a second vehicle 202 is attempting to make a left turn from a second left turn lane 206 from an opposite side of the roadway. Also as shown in FIG. 2, a third vehicle 204 is depicted behind the second vehicle 202.

In the depicted embodiment, both the vehicle 100 and the second vehicle 202 are waiting to make respective left turns. Also in the depicted embodiment, the respective vehicles 100, 202, are disposed in front of one another as the respective vehicles are waiting to make their respective left turns, with the vehicles 100, 202 disposed in respective left turn lanes 201, 206 that are on opposite sides of the intersection 200.

In accordance with various embodiments, the intersection 200 of FIG. 2 is depicted in accordance with certain regions of the world in which vehicles are driven on the right side of the road, and corresponds to left turns of the vehicles 100, 202 from respective left turn lanes 201, 206 of the intersection 200. Accordingly, the vehicles and/or drivers would cross oncoming traffic when making a left turn, and the video feed and information form the other vehicle in the opposing lane may be particularly beneficial in observing any oncoming traffic (e.g., for which a view of the oncoming traffic might otherwise be blocked by the other vehicle in the opposing lane).

It will be appreciated that in various other embodiments, the methods, systems, and vehicles disclosed within this Application may similarly be implemented with respect to one or more other scenarios. For example, in various embodiments, the methods, systems, and vehicle may be implemented for right turns (and respective right turn lanes) for certain other regions of the world in which vehicles are driven on the left side of the road (and thus, for which the vehicles and/or drivers would cross oncoming traffic when making a right turn). Furthermore, it will similarly be appreciated that in certain embodiments the methods, systems, and vehicles disclosed in this Application may also be implemented in various other scenarios, for example including the transmission of video feeds from other vehicles from one or more other locations of the intersection as the vehicle 100 is making a left turn or a right turn, and so on.

As will be explained in greater detail in connection with the process 300 discussed further below in connection with FIG. 3, in various embodiments the control system 104 of the vehicle communicates with the second vehicle 202 of FIG. 2 in a manner that facilitates both vehicles 100, 202 to make turns (e.g., left turns, in the example of FIG. 2). In various embodiments, the second vehicle 202 includes components (such as a camera, a display, navigation system, and a control system) that are similar or identification to the respective components of the vehicle 100 of FIG. 1.

In addition, also in various embodiments, the vehicles 100, 202 provide rear video feed and other information to assist the other vehicle in making a turn (e.g., a left turn in the example of FIG. 2, or a right turn in another region of the world in which vehicles are driven on the left side of the road). For example, in various embodiments, the second vehicle 202 provides rear video footage (from behind the second vehicle 202) to the vehicle 100 that includes footage of the third vehicle 204. In certain embodiments, the second vehicle 202 also provides additional information (such as a warning) pertaining to the third vehicle 204. Accordingly, the driver of the vehicle 100 (and/or the vehicle 100 itself) may take appropriate action based on the video feed and information provided by the second vehicle 202. Similarly, also in various embodiments, the vehicle 100 also provides rear video feed (from behind the vehicle 100) and information to the second vehicle 202 to assist the second vehicle 202 in making a left turn.

As depicted in FIG. 2, the vehicles 100, 202 communicate via one or more wireless networks 208. In various embodiments, the wireless networks 208 may comprise any one or more of a number of different types of networks and/or communication links, such as Wi-Fi, cellular, satellite, and/or other communication networks and/or links.

Figure 3:
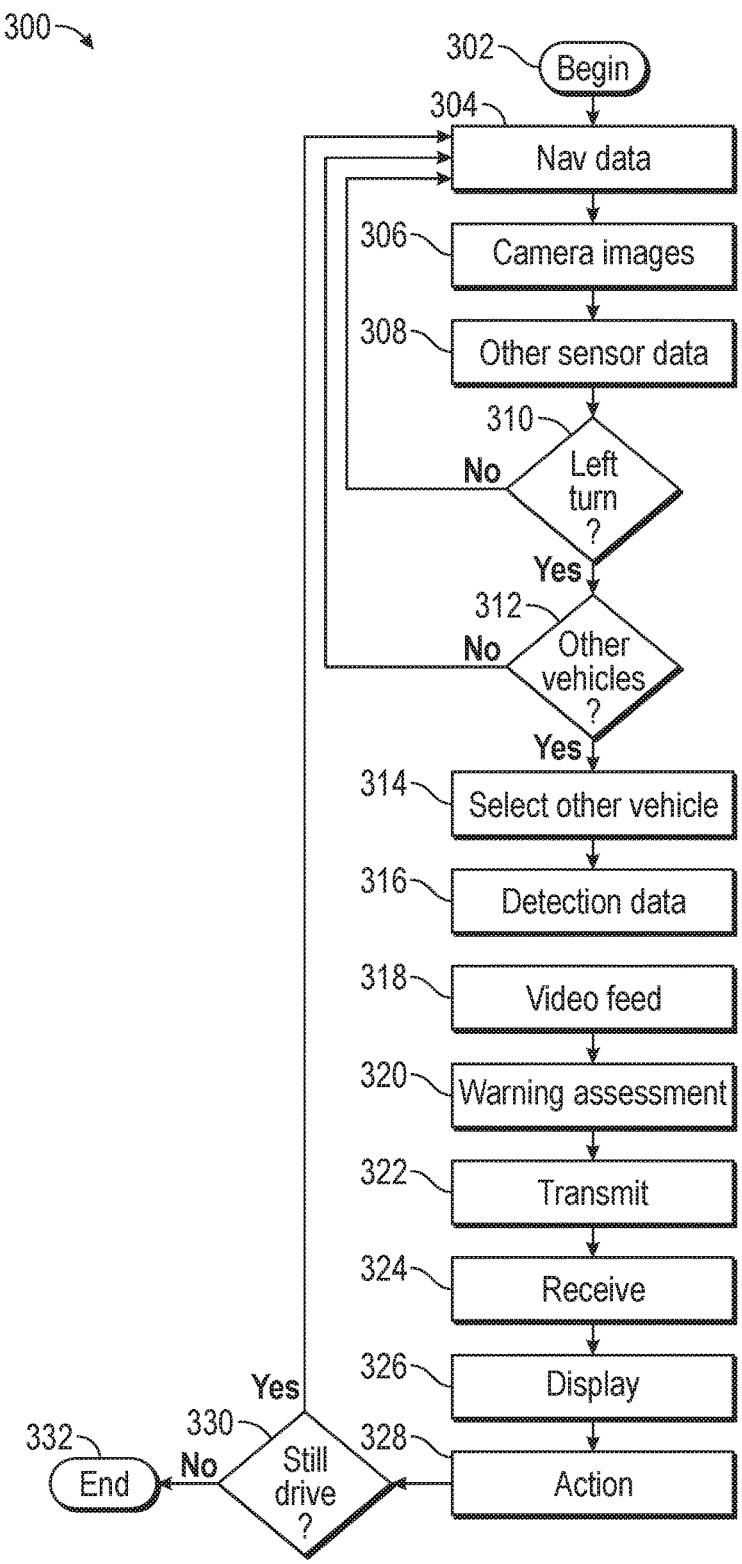
FIG. 3 is a flowchart of a process for controlling a vehicle that is about to make a turn, and that can be implemented in connection with the vehicle, cameras, control system, navigation system, and display of FIG. 1, and the illustration of FIG. 2, in accordance with an exemplary embodiment.

FIG. 3 is a flowchart of a process 300 for controlling a vehicle that is about to make a left turn, in accordance with an exemplary embodiment. The process 300 can be implemented in connection with the vehicle 100, cameras 102, navigation system 106, display 108, and control system 104 of FIG. 1, along with the vehicles 202, 204 and implementation of FIG. 2, in accordance with an exemplary embodiment.

As depicted in FIG. 3, the process begins at 302. In one embodiment, the process 300 begins when a vehicle drive or ignition cycle begins, for example when a driver approaches or enters the vehicle 100, or when the driver turns on the vehicle and/or an ignition therefor (e.g. by turning a key, engaging a keyfob or start button, and so on). In one embodiment, the steps of the process 300 are performed continuously during operation of the vehicle. It will also be appreciated that, in various embodiments, the steps of the process 300 may be performed by multiple vehicles at the same time, such as the vehicle 100 and the second vehicle 202 of FIGS. 1 and 2.

Navigation data is obtained (step 304). In various embodiments, navigation data is obtained from the navigation system 106 of FIG. 1 (e.g., from a GPS system). Also, in various embodiments, the navigation data includes a location/position of the vehicle interposed with a map of a roadway in which the vehicle is travelling. In various embodiments, the navigation data is provided to the processor 132 of FIG. 1.

Camera images are obtained (step 306). In various embodiments, camera images are obtained from the cameras 102 of FIG. 1. In various embodiments, the camera images include video images from behind and in front of the vehicle. In certain embodiments, the camera images also include video images from one or more other points of view (e.g., from on top of the vehicle, and/or a surround view, and so on). In various embodiments, the navigation data is provided to the processor 132 of FIG. 1.

Other sensor data is obtained (step 308). In various embodiments, sensor data is obtained from one or more other sensors 128 of FIG. 1 (e.g., wheel speed sensors, accelerometers, wheel position sensors, steering angle sensors, turn direction sensors, gear sensors, and so on) with information pertaining to whether the vehicle is about to make a left turn. In various embodiments, the other navigation data is provided to the processor 132 of FIG. 1.

A determination is made as to whether the vehicle is about to make a turn (step 310). In certain embodiments, a determination is made as to whether the vehicle is about to make a left turn (e.g., in a region of the world in which vehicles are driven on a right side of the road). In certain other embodiments, a determination is made as to whether the vehicle is about to make a right turn (e.g., in a region of the world in which vehicles are driven on a right side of the road). Accordingly, similar to the discussion above with respect to FIG. 2, while certain examples may be described herein with respect to left turns (e.g., using left turn lanes, and for example applying in regions of the world in which vehicles are driven on the right side of the road), it will be appreciated that the process would likewise be applicable to right turns (e.g., using right turn lanes, and for example applying in regions of the world in which vehicles are driven on the left side of the road), and so on.

In various embodiments, a vehicle is determined to be "about" to take a turn (e.g., a left) turn when a position, location, angle, and/or other characteristic of the vehicle 100 indicates that the vehicle 100 is positioned to make a left turn, is waiting to make a turn (e.g., a left turn), and/or is expected to make a turn (e.g., a left turn) within a predetermined amount of time. In various embodiments, this determination is made by the processor 132 of FIG. 1 using the navigation data of step 304, the camera images of step 306, and the other sensor data of step 308. For example, in certain embodiments, the navigation data may be used to determine an exact location of the vehicle with respect to a roadway, an intersection thereof, and a turn lane thereof, and so on. Also by way of example, the camera images may also be used to determine the placement (e.g., position, and angle) of a vehicle with respect to an intersection and a turn lane thereof, and so on. Also by way of example, the other sensor data may also be used to determine whether the vehicle is stopped at an intersection, whether the vehicle is stopped at a specific turn lane (e.g., a left turn lane) within the intersection, whether a steering angle is turned, whether a wheel of the vehicle is turned, whether a turn directional signal is activated, whether a current navigation path calls for a specific turn (e.g., a left turn), and so on. In various embodiments, any combination of these details may be utilized, separately or together, in determining whether the vehicle is about to make a turn (e.g., a left turn).

If it is determined that the vehicle is not about to make a turn (e.g., in various embodiments, a left turn), then the process returns to step 304. Steps 304-310 then repeat until a determination is made in an iteration of step 310 that the vehicle is about to make a turn (e.g., in various embodiments, a left turn).

Once it is determined in an iteration of step 310 that the vehicle is about to make a turn (e.g., in various embodiments, a left turn), then a determination is made as to whether there are any other vehicles that may be able to provide video feed or other information to assist the vehicle in making the turn (e.g., in various embodiments, the left turn) (step 312). In various embodiments, this determination is made by the processor 132 of FIG. 1 using the camera images of step 306. In certain embodiments, front camera images from the vehicle 100 are used to determine whether a second vehicle 202 is disposed in an opposing turn lane (e.g., in various embodiments, an opposing left turn lane, such as lane 206 of FIG. 2) in front of the vehicle 100 and its respective turn lane (e.g., lane 201 of FIG. 2). In certain embodiments, in addition to camera data, one or more other types of data, such as global positioning system (GPS), high definition (HD) map, vehicle to vehicle and/or infrastructure, radar, LIDAR, and/or combinations thereof, may be utilized, for example, for sensing the opposing vehicle. If it is determined that there is not another vehicle that may be able to provide the video feed or other information, then the vehicle continues with its normal turn (e.g., in various embodiments, a left turn) processes, and the process returns to step 304. Steps 304-312 then repeat until a determination is made in an iteration of step 312 that the vehicle is about to make a turn (e.g., in various embodiments, a left turn).

Once it is determined in an iteration of step 312 that another vehicle that may be able to provide the video feed or other information, then one or more such other vehicles is selected (step 314). In certain embodiments, each of the other vehicles is selected, so that each of the other vehicles may provide video feed and/or other information for the vehicle 100. In certain other embodiments, the first other vehicle in the left turn lane (e.g., the closest other vehicle to the vehicle 100) is selected during step 314 (e.g., as the first other vehicle in line may have the best angle to detect oncoming vehicles, in certain situations and/or embodiments). In certain other embodiments, the first other vehicle in the left turn lane (e.g., the closest other vehicle to the vehicle 100) is selected during step 314 (e.g., as the last other vehicle in line may have the closest and/or most unobstructed view of any oncoming vehicles, in certain situations and/or embodiments). It will similarly appreciated that one or more of these other vehicles may also be making a similar determination with respect to the vehicle 100. In certain embodiments, the selection is automatic, as the vehicle in the opposing lane would know through its systems (e.g., GPS) and/or other sensors that it is at an intersection and is preparing for a turn.

Detection data is obtained (step 316). In various embodiments, detection data is obtained using the detection sensors 126 of the sensor array 120 of FIG. 1 (e.g., radar, lidar, sonar), and/or via respective cameras 102 of the vehicles. In certain embodiments, the detection data is obtained from each vehicle with respect to any vehicles or other objects behind such vehicles that might pose a problem for vehicles in an opposite direction that are about to turn (e.g., in various embodiments, that are about to turn left). For example, in one embodiment, the second vehicle 202 of FIG. 2 obtains detection data behind the second vehicle 202 (e.g., including detection of the third vehicle 204 of FIG. 2) that may relate to the ability of the vehicle 100 to successfully make a turn (e.g., in various embodiments, a left turn). Similarly, also in one embodiment, the second vehicle 100 of FIGS. 1 and 2 similarly obtains detection data behind the vehicle 100 that may relate to the ability of the second vehicle 202 to successfully make a turn (e.g., in various embodiments, a left turn).

Video feeds are obtained (step 318). In various embodiments, the different vehicles that are about to make the left turns (e.g., the vehicle 100 and the second vehicle 202 of FIGS. 1 and 2) prepare the video feeds from behind the respective vehicles for transmission to the other vehicles, based on instructions provided by the processor 132. In certain embodiments, video feeds are shared between the vehicles 100, 202 using one or more transceivers and/or communication networks, for example such as a vehicle to vehicle mesh network (e.g., including DSRC, LTE, WiFi, and/or other communications), a peer to peer network, and/or one or more other communication networks. Also in certain embodiments, such localized exchange of information can be accomplished without requiring any back office, remote server, or cloud information. In certain embodiments, the video sharing feature can be enabled as a customization, and when both vehicles arrive at the intersection with the feature enabled the video sharing feature may occur automatically.

In various embodiments, assessments are also made (step 320). In certain embodiments, the vehicles gathering the detection data of step 316 and the video feed of step 318 make respective determinations (using respective processors) as to whether the detected objects may pose a problem for the other vehicle's turn (e.g., in various embodiments, a left turn). For example, in one embodiment, the second vehicle 202 of FIG. 2 makes a determination as to whether the third vehicle 204 (and/or any other vehicles and/or other objects behind the second vehicle 202) may pose a problem for the vehicle 100's desired left turn. Similarly, also in one embodiment, the vehicle 100 makes a similar determination as to whether any other vehicles or objects behind the vehicle 100 may pose a problem for the second vehicle 202's desired left turn. Also in various embodiments, these determinations are made by the respective processors (e.g., processor 132 of FIG. 1) of the respective vehicles, for example by determining whether any approaching vehicles or objects are likely to intersect with the path of the proposed left turn, and/or whether any approaching vehicles or objects are within a predetermined time and/or distance from reaching the intersection and/or the path of the proposed left turn, and so on. In various embodiments, if a determination is made that such a problem may exist (e.g., that a detected vehicle or other object may interfere with the left turn), then a warning is prepared to send to the other vehicle.

The video feeds and information are transmitted (step 322). In various embodiments, the vehicles transmit respect video feeds from step 318, and any appropriate assessments and/or warnings from step 320, to the other vehicle via the wireless network 208 of FIG. 2. In certain embodiments, respective vehicles in opposing turn lanes, such as an opposing left turn lane (e.g., the vehicle and the second vehicle 202, as depicted in FIG. 2) provide the respective video feeds and information to one another via respective transceivers 122 of FIG. 1 (e.g., via instructions provided by respective processors 132 of FIG. 1). In certain embodiments, a particular vehicle sends such video feeds and information to another vehicle if the particular vehicle is selected to do so in step 314.

The video feeds and information are then received (step 324). In various embodiments, respective vehicles that are about to make turns (e.g., in various embodiments, a left turn) receive the respective video feeds and information from the transmitting vehicles (e.g., the vehicle(s) in opposing left turn lanes) of step 322. For example, in one embodiment, the vehicle 100 of FIGS. 1 and 2 receives the video feeds and information from the second vehicle 202 of FIG. 2, and the second vehicle 202 receives the video feeds and information from the vehicle 100 (via respective transceivers 122 of FIG. 1), and so on.

The received video images and information are displayed (step 326). In various embodiments, the received video images and information are provided on the receiving vehicle via the display 108 of FIG. 1 for viewing by the driver and/or passengers of the vehicle that is about to make the turn (e.g., in various embodiments, a left turn), in accordance with instructions provided by the processor 132 of FIG. 1.

For example, in various embodiments, during step 326, a driver of the vehicle 100 of FIGS. 1 and 2 can look at the display 108 and view the roadway behind the second vehicle 202 of FIG. 2, including the third vehicle 204. Accordingly, the driver of the vehicle 100 could then wait to make the left turn until the third vehicle 204 clears the intersection and the route of the left turn is clear from other vehicles and objects. This may be particularly useful, for example, as the third vehicle 204 might otherwise be obstructed from the view of the driver of the vehicle 100 (e.g., the view might otherwise be blocked by the second vehicle 202). In addition, if an assessment or warning is determined in step 320 and transmitted in step 322, then such assessment or warning may also be displayed as part of step 326 (e.g., a visual and/or audio warning that an oncoming vehicle is approaches, and/or that the path to make the left turn is not yet clear, and so on). Similarly, the driver of the second vehicle 202 can similarly view video footage from behind the vehicle 100 and/or receive warnings regarding potential vehicles or other objects, to assist the driver of the second vehicle 202 in making its own left turn.

In addition, in certain embodiments, predetermined actions may be taken (step 328). For example, in certain embodiments, one or more automated systems may take one or more processor-initiated actions, such as initiating the turn (e.g., in various embodiments, a left turn), waiting to initiate the turn, and/or preventing the driver from initiating the turn, based on the received video feeds and/or other information. For example, in certain embodiments, an autonomous or semi-autonomous vehicle may wait to make the turn (e.g., in various embodiments, a left turn) until the pathway is clear of other vehicles and obstacles, based on the received video feeds and/or other information. In other embodiments, the receiving vehicle may make its own assessments and/or determinations of possible problems for the turn (e.g., in various embodiments, a left turn) based on the received video feeds, for example in relation to possible oncoming vehicles and/or other objects (e.g., similar to the analysis of step 320), and providing warnings and/or other appropriate actions (e.g. automatic braking, automatic steering, automatically waiting before initiating the turn, and so on).

In certain embodiments, a determination is then made as to whether the current vehicle drive is continuing (step 330). In certain embodiments, this determination is made by the processor 132 of FIG. 1, for example based on sensor and/or navigation information (e.g., as to whether the vehicle ignition is still on, whether the vehicle has reached its destination, and so on). In certain embodiments, if the vehicle drive is continuing, then the process returns step 304. Also in certain embodiments, once the vehicle drive is over, the process terminates at step 332.

Accordingly, the systems, vehicles, and methods thus provide for potentially improved control of vehicles when making turns (e.g., in various embodiments, vehicles making left turns). For example, in various embodiments, when a vehicle is about to make a left turn, the vehicle obtains video feeds from another vehicle (e.g., video feeds from behind another vehicle in an opposing left turn lane) to assist the driver of the vehicle in making a left turn. Also in certain embodiments, the vehicle may also obtain assessments and/or warning from the other vehicle, also to assist the driver of the vehicle (or the vehicle itself, in certain embodiments) in making the left turn.

It will be appreciated that the systems, vehicles, and methods may vary from those depicted in the Figures and described herein. For example, the vehicle 100, the cameras 102, the control system 104, the navigation system 106, the display 108, and/or components thereof of FIG. 1, and/or the additional vehicle 202 and/or implementations of FIG. 2, may vary in different embodiments. It will similarly be appreciated that the steps of the process 300 may differ from those depicted in FIG. 3, and/or that various steps of the process 300 may occur concurrently and/or in a different order than that depicted in FIG. 3, in various embodiments.

Furthermore, similar to the discussions above, while certain examples may be described herein with respect to left turns (e.g., using left turn lanes, and for example applying in regions of the world in which vehicles are driven on the right side of the road), it will be appreciated that the methods, systems, and vehicles described herein would likewise be applicable in various embodiments to right turns (e.g., using right turn lanes, and for example applying in regions of the world in which vehicles are driven on the left side of the road), and so on, among other possible variations.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method comprising:
   determining, via a processor, when a first vehicle is about to make a turn at an intersection;
   receiving, via a transceiver, a video feed from one or more cameras of an approaching second vehicle, the approaching second vehicle disposed proximate the intersection, when the first vehicle is about to make the turn, for use in assistance with making the turn of the first vehicle at the intersection, wherein the video feed includes camera images from behind the approaching second vehicle that are in an obstructed field of view from a perspective of a driver of the first vehicle, in which the field of view is obstructed at least in part by the approaching second vehicle; and
   taking an automatic action, via instructions provided by the processor, based on the video feed, wherein the automatic action comprises one or more of: providing a display with the video feed on a display device of the first vehicle, initiating a turn, waiting to initiate a turn, preventing a driver from initiating a turn, providing a warning, controlling automatic braking, or controlling automatic steering.

2. The method of claim 1, wherein the receiving step occurs when the approaching second vehicle is disposed in front of the approaching second vehicle as the first vehicle is waiting to make the turn.

3. The method of claim 1, wherein the receiving step occurs when:
   the first vehicle is disposed within a turn lane of the intersection; and
   the approaching second vehicle is disposed within an opposing turn lane of the intersection, opposite the turn lane.

4. The method of claim 1, further comprising:
   receiving, via the transceiver, the warning from the approaching second vehicle with respect to a detected object; and
   providing the warning for the driver of the first vehicle.

5. The method of claim 1, further comprising:
obtaining further video images from behind the first vehicle, via a camera; and
transmitting the further video images, via the transceiver, in accordance with instructions provided by the processor, to the approaching second vehicle, to assist the approaching second vehicle in making a respective turn of the approaching second vehicle.

6. The method of claim 1, wherein:
the determining step comprises determining, via the processor, when the first vehicle is about to make a left turn at an intersection, based at least in part on whether the first vehicle is in a left turn lane of the intersection; and
the receiving step comprises receiving, via the transceiver, the video feed from the one or more cameras of the approaching second vehicle, including images from behind the approaching second vehicle, when the first vehicle is disposed within the left turn lane of the intersection and the approaching second vehicle is disposed within an opposing second left turn lane of the intersection, opposite the left turn lane.

7. A system comprising:
a processor configured to determine when a first vehicle is about to make a turn at an intersection; and
a transceiver configured to receive a video feed from one or more cameras of an approaching second vehicle, the approaching second vehicle disposed proximate the intersection, when the first vehicle is about to make the turn, for use in assistance with making the turn of the first vehicle at the intersection, wherein the video feed includes camera images from behind the approaching second vehicle that are in an obstructed field of view from a perspective of a driver of the first vehicle, in which the field of view is obstructed at least in part by the approaching second vehicle;
wherein the processor is further configured to provide instructions for taking an automatic action based on the video feed, wherein the automatic action comprises one or more of: providing a display with the video feed on a display device of the first vehicle, initiating a turn, waiting to initiate a turn, preventing a driver from initiating a turn, providing a warning, controlling automatic braking, or controlling automatic steering.

8. The system of claim 7, wherein the transceiver is configured to receive the video feed when:
the first vehicle is disposed within a turn lane of the intersection; and
the approaching second vehicle is disposed within an opposing turn lane of the intersection, opposite the turn lane.

9. The system of claim 7, further comprising:
the display device configured to display the video feed, in accordance with instructions provided by the processor.

10. The system of claim 9, wherein:
the transceiver is further configured to receive the warning from the approaching second vehicle with respect to a detected object; and
the display device is further configured to provide the warning for the driver of the first vehicle, in accordance with instructions provided by the processor.

11. The system of claim 7, wherein:
the processor is configured to determine when the first vehicle is about to make a left turn at the intersection; and
the transceiver is configured to receive the video feed from the one or more cameras of the approaching second vehicle when the first vehicle is about to make the left turn, for use in assistance with making the turn of the first vehicle at the intersection.

12. A vehicle comprising:
one or more sensors configured to generate sensor data pertaining to operation of the vehicle;
a processor configured to determine when the vehicle is about to make a turn at an intersection, based at least in part on the sensor data;
a transceiver configured to receive a video feed from one or more cameras of an approaching second vehicle, the approaching second vehicle disposed proximate the intersection, when the vehicle is about to make the turn, for use in assistance with making the turn of the vehicle at the intersection, wherein the video feed includes camera images from behind the approaching second vehicle that are in an obstructed field of view from a perspective of a driver of the vehicle, in which the field of view is obstructed at least in part by the approaching second vehicle; and
a display device configured to display the video feed in accordance with instructions provided by the processor;
wherein the processor is configured to provide instructions for taking an automatic action based on the video feed, wherein the automatic action comprises one or more of: providing a display with the video feed on a display device of the vehicle, initiating a turn, waiting to initiate a turn, preventing a driver from initiating a turn, providing a warning, controlling automatic braking, or controlling automatic steering.

13. The vehicle of claim 12, wherein the transceiver is configured to receive the video feed when:
the vehicle is disposed within a left turn lane of the intersection and is about to make a left turn at the intersection; and
the approaching second vehicle is disposed within an opposing left turn lane of the intersection, opposite the turn lane.

14. The vehicle of claim 13, further comprising:
a camera configured to obtain further video images from behind the vehicle;
wherein the transmitter is further configured to transmit the further video images, in accordance with instructions provided by the processor, to the approaching second vehicle, to assist the approaching second vehicle in making a respective left turn of the approaching second vehicle.

\* \* \* \* \*